(No Model.) 2 Sheets—Sheet 1.
M. McANENY.
BICYCLE.
No. 600,839. Patented Mar. 15, 1898.
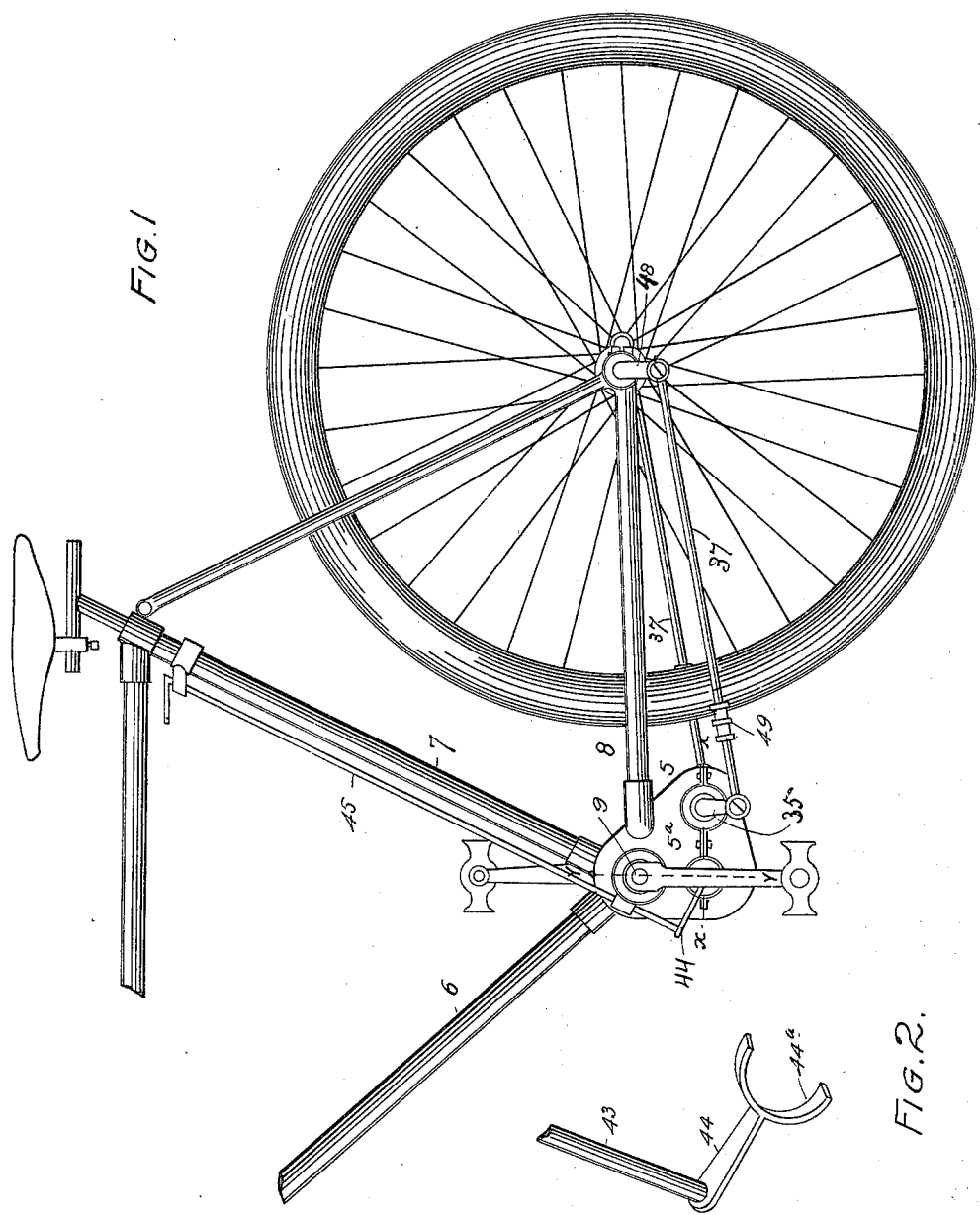
Witnesses
Inventor
M. McAneny
By his Attorney

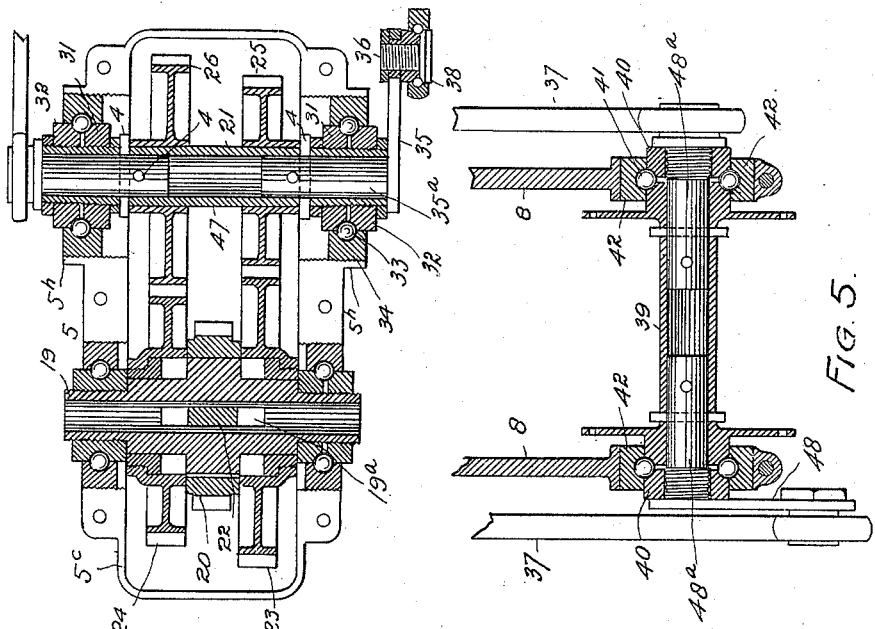

UNITED STATES PATENT OFFICE.

MICHAEL McANENY, OF DENVER, COLORADO, ASSIGNOR TO THE COLUMBINE CYCLE COMPANY, OF SAME PLACE.

BICYCLE.

SPECIFICATION forming part of Letters Patent No. 600,839, dated March 15, 1898.

Application filed September 14, 1896. Serial No. 605,836. (No model.)

*To all whom it may concern:*

Be it known that I, MICHAEL MCANENY, a citizen of the United States of America, residing at Denver, in the county of Arapahoe and State of Colorado, have invented certain new and useful Improvements in Bicycles; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in bicycles, and comprises a differential speed-gear, means for housing and controlling the gear, and means for connecting the gear with the rear axle, all as hereinafter described and claimed, reference being made to the accompanying drawings, in which is illustrated an embodiment thereof.

In the drawings, Figure 1 is a side elevation of a bicycle equipped with my improvements. Fig. 2 is a perspective view of the device for shifting the clutch-pin. Fig. 3 is a horizontal section taken on the line $xx$, Fig. 1. Fig. 4 is a vertical section taken on the line $yy$, Fig. 1. Fig. 5 is a section taken through the rear axle. Fig. 6 is a sectional view in detail of one of the clutch members. Fig. 7 is a face view of the same.

Similar reference characters indicating corresponding parts in the views, let the numeral 5 designate a dust-proof casing or housing for the nest of gears. This casing comprises the upper or stationary part $5^a$, having thimbles for the reception of the frame-bars 6, 7, and 8, which are brazed thereto, and the lower or detachable part $5^c$, secured to the stationary part by screws or other suitable fastening devices passing through coinciding apertures formed in suitable flanges with which the casing parts are provided. Journaled in the upper part $5^a$ of this casing is the crank-shaft 9, upon whose central tapering portion is mounted a gear 10, which is keyed or otherwise made fast to the shaft. This gear is further secured in place by a nut 12, screwed on the shaft to engagement with the hub of the gear. The crank-shaft is further provided with two pairs of cones screwed upon the threaded portion thereof. The respective cones of each pair are designated by the numerals 13 and 14. Screwed into horizontal sleeves $5^d$ of the casing, which are interiorly threaded for the purpose, are the grooved bearings 15, which coöperate with the cones in holding the small balls 16 in place. The cones when adjusted are held in place by locking-nuts 17 and 18, respectively.

Directly below the crank-shaft and journaled in the casing, between the two parts thereof, is the clutch-sleeve 19, upon whose central enlarged portion is keyed a pinion 20, meshing with the gear 10 of the crank-shaft. Also mounted on the sleeve 19 and engaging shoulders on each side of its enlarged central portion are the female clutch members 21, each having a series of recesses $21^a$, adapted to receive a pin 22, passed through a slot in the sleeve and adapted to slide therein to engagement with either clutch member for the purpose hereinafter specified. These clutch members are shouldered and their reduced portions are threaded to receive gears 23 and 24, respectively. These gears are of different size, the gear 23 being the larger. Their hubs surround the clutch members and they are located close to the pinion 20 on either side thereof. The gears are fast on the clutches, the latter being normally loose on the sleeve. When the clutch-pin 22 occupies a central position, as shown in the drawings, it lies between two clutches and engages neither. In this case the sleeve moves independently of the gears, which have no motion. It is evident, however, that by shifting the clutch-pin to engagement with the clutch members either gear may be made to rotate with the sleeve.

The clutch-pin is composed of a flat piece of metal of sufficient width to nearly fill the space between the clutch members. The slot $19^a$ of the clutch-sleeve is considerably longer than the width of the pin, its length being sufficient to allow the pin to slide in either direction to engagement with the recesses of the clutch.

Screwed upon the threaded extremities of the sleeve 19 are two pairs of cones, whose members are designated by the numerals 27 and 28, respectively. Coöperating with each pair of cones is a grooved bearing 29, screwed into sleeves 5ᵍ, formed on the casing. The bearing-balls 30 are located between the cones and the parts 29. The inner cones engage shoulders formed on the clutch-sleeve and are located just outside of the clutch members. Their thickness is such that they project beyond their engaging shoulders and engage the clutch members, locking them securely in place.

The gears 23 and 24 mesh with two gears 25 and 26, respectively. These last-named gears are mounted upon and made fast to a hollow shaft 47, journaled in the casing, between the two parts thereof, its center being in the same horizontal plane with the center of the shaft 19. The extremities of the shaft 47 are threaded to receive two pairs of cones, the members of each pair being designated by the numerals 31 and 32, respectively. The balls 33, engaging these cones, are held in place by an outer bearing 34, screwed into sleeves 5ʰ, formed on the casing.

In the open extremities of the hollow shaft 47 are inserted and fastened cylindrical projections 35ᵃ, formed on the cranks 35, at right angles to the latter. The fastening devices consist of two pins 4, passed at right angles through coinciding apertures formed in the hollow shaft and each projection 35ᵃ. These pins also lock the gears 25 and 26 on the shaft. The outer extremities of the cranks 35 are provided with wrists 36, to which are attached the forward extremities of the connecting-rods 37 by means of ball-bearings 38. The rear extremities of these rods are similarly attached to cranks 48, having stems 48ᵃ inserted and fastened in the open extremities of the hollow hub 39 of the rear wheel by means of pins 4, passing through apertures formed in the stems and hub. A cone 40 is screwed on each crank-stem 48ᵃ. The balls 41 are located between the cones and shoulders formed on the hub. The balls are surrounded by an outer casing 42, fast on the frame.

When the clutch-pin 22 is in the central position, as shown in Figs. 3 and 4, the clutch-sleeve turns loosely on its bearings when the crank-shaft is rotated, and consequently no movement is imparted to the bicycle. This position of the clutch-pin is adapted for coasting, since the machine may run without moving the crank-shaft. Hence the feet may rest on the pedals without movement. The clutch-pin 22 is fastened to a shifting device 43, consisting of a stem or short rod adapted to telescope or move endwise within the clutch-sleeve. The outer extremity of this stem is adapted to receive the forked extremity 44ᵃ of a crank 44, made fast to the lower extremity of a rod 45, movably mounted on the frame, the upper extremity of said rod being located within easy reach of the rider when mounted. By turning the rod 45 in one direction the device 43 may be moved sufficiently to cause the clutch-pin 22 to engage the clutch member 21. When this occurs, the rotation of the crank-shaft imparts movement to the bicycle, since the gear 10, meshing with the pinion 20, rotates the clutch-sleeve, causing the gear 24 to turn, the last-named gear being fast on the clutch member. The gear 24, meshing with the gear 26, rotates the shaft 21 and imparts movement to the rear wheel through the medium of the connecting-rods and the cranks attached thereto. The size of the gear 24 in this case determines the speed of the machine as the crank-shaft is rotated. If a greater speed is desired for a given rotation of the crank-shaft, the clutch-pin is again shifted and made to engage the clutch 21. In this case motion will be imparted to the gear 23, which engages the small gear 25 on the shaft 27.

By means of this construction the rider may adapt the gear to the condition of the road on which he is riding. He may have the lower gear while climbing hills, the higher gear on level ground, and no gear at all while going downhill or coasting. Hence the advantages of this mechanism will be readily understood.

Each connecting-rod 37 is composed of two parts connected by a turnbuckle 49, through the instrumentality of which the length of the rods may be controlled and regulated or adjusted at will.

Having thus described my invention, what I claim is—

1. In a bicycle-gear, the combination with a casing mounted upon the frame, of a crank-shaft journaled therein, a gear centrally mounted thereon, and made fast thereto, a slotted clutch-sleeve also journaled in the casing and having shoulders on each side of its center, which is enlarged, a pinion keyed on the central portion of the sleeve, a clutch member loosely mounted on the sleeve and engaging each shoulder thereof, said clutch members being provided with recesses adapted to register with the slot in the sleeve, a pin passing through the slot in the sleeve and adapted to slide to engagement with the clutch members, gears of unequal size applied to the respective clutch members, means for shifting the clutch-pin to engagement with either clutch member as desired, means for holding the clutch members and their respective gears in place upon the sleeve, another shaft journaled in the casing and carrying fast gears meshing with the gears on the clutch-sleeve, and means for connecting the last-named shaft with the rear wheel, substantially as described.

2. The combination with a casing mounted on the bicycle-frame, of a crank-shaft journaled therein and a gear fast on said shaft, of a clutch-sleeve also journaled in the casing and having a shoulder on each side of its enlarged central portion, said sleeve being provided with a slot extending through the enlarged portion and beyond the shoulders on either side, a pinion keyed on the central portion of the sleeve and meshing with the gear on the crank-shaft, a clutch member loosely mounted on the sleeve and engaging the shoulder on each side of the center, said members being recessed to coincide with the slot extremities, a pin passed through the slot in the sleeve and adapted to slide to engagement with either clutch member, differential gears mounted on the respective clutch members and made fast thereto, means for shifting the clutch-pin to engagement with either clutch member, another shaft journaled in the casing and carrying fast gears meshing with the differential gears on the sleeve, and rods for connecting cranks on the last-named shaft with cranks on the hub of the rear wheel, which is journaled in the frame, substantially as described.

3. In a bicycle-gear, the combination with a suitable casing, the crank-shaft journaled therein and the gear made fast on said shaft, of the slotted clutch-sleeve journaled in the casing, a pinion made fast to the central portion of said sleeve and meshing with the gear on the crank-shaft, a pin passed through the slot in the sleeve, a clutch member loosely mounted on the sleeve on each side of the pinion and having recesses adapted to register with the extremities of the slot in the sleeve, differential gears carried by the respective clutch members, another shaft journaled in the casing and carrying fast gears meshing with the differential gears on the sleeve, a stem attached to the clutch-pin and telescoping in the clutch-sleeve and suitable means connected with the outer extremity of said stem for shifting the pin, substantially as described.

4. In a bicycle-gear, the combination of a suitable casing and the crank-shaft journaled therein, of the gear made fast on said shaft, the clutch-shaft journaled in the casing and carrying a sliding device for locking the gears thereon, a pinion fast on the clutch-shaft and meshing with the gear on the crank-shaft, two gears of unequal size loosely mounted on said clutch-shaft, one being located on each side of the pinion and each being adapted to engage the locking device when the latter is properly adjusted, means for shifting the locking device to engagement with either gear, a third shaft journaled in the casing, gears fast on the last-named shaft and meshing with the gears on the clutch-shaft, and suitable means for connecting the third shaft with the rear wheel.

5. In a bicycle-gear, the combination with the casing mounted upon the frame, of a crank-shaft journaled therein, a gear mounted thereon and made fast thereto, a slotted sleeve journaled in the casing, a pinion fast on the sleeve, a clutch member loosely mounted on the sleeve on each side of the pinion, a pin or equivalent device passing through the slot in the sleeve and adapted to slide to engagement with the clutch members, gears of unequal size applied to the respective clutch members, means for shifting the clutch-pin to engagement with either clutch member as desired, another shaft journaled in the casing and carrying fast gears meshing with the gears on the clutch-sleeve, and means for connecting the last-named shaft with the rear wheel.

6. The combination with a casing, of a crank-shaft journaled therein, a gear fast thereon, a shaft 19 also journaled on the casing and having two separated shoulders, said shaft being provided with a slot located between and extending beyond the said shoulders on either side, a pinion fast on the shaft between the two shoulders and meshing with the gear on the crank-shaft, clutch-gears differing in size engaging the shoulders on the shaft 19 and located on each side of the pinion, said gears having recesses adapted to register with the extremities of the slot in the said shaft, a pin engaging the slot in the shaft and adapted to slide to engagement with either clutch-gear, suitable means for shifting the clutch-pin to engagement with each clutch-gear, another shaft also journaled in the casing, and gears fast thereon and meshing with the gears on the shaft 19.

7. In a speed-gear, the combination with a suitable support, of a shaft journaled therein and having two separated shoulders, said shaft having a slot formed between the said shoulders and projecting beyond the same, a gear or pinion fast on the shaft between the shoulders, and clutch-gears loosely mounted respectively on opposite sides of said pinion and engaging the shoulders on said shaft, said gears having recesses adapted to register with the extremities of the slot in the shaft, a pin engaging said slot, and means for shifting this pin to engagement with either clutch-gear.

8. In a speed-gear, the combination with a suitable casing, of three shafts 9, 19, and 47 journaled therein, a gear fast on the shaft 9, a pinion fast on the shaft 19 and meshing with the gear on the shaft 9, two gears of unequal size loosely mounted on the shaft 19 on each side of the pinion, adjustable means for locking either gear on the shaft 19 at will, and two gears fast on the shaft 47 and meshing with the gears on the shaft 19.

In testimony whereof I affix my signature in presence of two witnesses.

MICHAEL McANENY.

Witnesses:
A. B. DANIELS,
ISHAM R. HOWZE.